United States Patent
Wang et al.

(10) Patent No.: US 10,917,894 B2
(45) Date of Patent: Feb. 9, 2021

(54) SIGNAL MODIFICATION VIA PHASE OR FREQUENCY SHIFTING

(71) Applicant: QUALCOMM Incorporated, San Diego, CA (US)

(72) Inventors: Xiao Feng Wang, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/973,848

(22) Filed: May 8, 2018

(65) Prior Publication Data

US 2018/0332589 A1    Nov. 15, 2018

Related U.S. Application Data

(60) Provisional application No. 62/504,451, filed on May 10, 2017.

(51) Int. Cl.
*H04W 72/04* (2009.01)
*H04W 72/08* (2009.01)
(Continued)

(52) U.S. Cl.
CPC ........... *H04W 72/0466* (2013.01); *H04L 1/08* (2013.01); *H04L 5/0053* (2013.01);
(Continued)

(58) Field of Classification Search
CPC ......... H04W 72/0466; H04W 74/0833; H04W 72/082; H04L 5/0053; H04L 25/00; H04L 5/0064; H04L 1/08; H04L 25/03866
See application file for complete search history.

(56) References Cited

U.S. PATENT DOCUMENTS

2010/0178912 A1*  7/2010  Gunnarsson .......... H04W 24/02
                                                    455/423
2012/0207097 A1*  8/2012  Lee .......................... H04L 1/08
                                                    370/328
(Continued)

OTHER PUBLICATIONS

Partial International Search Report—PCT/US2018/031810—ISA/EPO—dated Aug. 24, 2018.
(Continued)

*Primary Examiner* — Brandon J Miller
(74) *Attorney, Agent, or Firm* — Haynes and Boone, LLP

(57) ABSTRACT

An example method of wireless communication includes applying, by a first wireless communication device, a scrambling sequence associated with a cell to a set of symbol groups in a repetition. The method also includes transmitting, by the first wireless communication device to a second wireless communication device associated with the cell, the set of symbol groups after the scrambling sequence is applied to the set of symbol groups. Another example method of wireless communication includes applying, by a first wireless communication device, a frequency shift associated with a cell to a set of symbol groups in a repetition. The method also includes transmitting, by the first wireless communication device to a second wireless communication device associated with the cell, the set of symbol groups after the frequency shift is applied to the set of symbol groups.

20 Claims, 10 Drawing Sheets

(51) Int. Cl.
   *H04W 74/08* (2009.01)
   *H04L 1/08* (2006.01)
   *H04L 5/00* (2006.01)
   *H04L 25/00* (2006.01)
   *H04L 25/03* (2006.01)

(52) U.S. Cl.
   CPC ............ *H04L 5/0064* (2013.01); *H04L 25/00* (2013.01); *H04W 72/082* (2013.01); *H04W 74/0833* (2013.01); *H04L 25/03866* (2013.01)

(56) References Cited

U.S. PATENT DOCUMENTS

| | | | |
|---|---|---|---|
| 2012/0289178 A1* | 11/2012 | Matsumura | H04W 52/0206 455/403 |
| 2013/0083867 A1* | 4/2013 | Frenne | H04B 7/08 375/308 |
| 2015/0124746 A1* | 5/2015 | Wu | H04W 74/008 370/329 |
| 2015/0365926 A1* | 12/2015 | Long | H04W 4/70 370/329 |
| 2016/0269939 A1* | 9/2016 | Papasakellariou | H04L 5/0053 |
| 2017/0127422 A1* | 5/2017 | Eriksson Lowenmark | H04L 1/08 |
| 2017/0223743 A1* | 8/2017 | Lin | H04L 27/2607 |
| 2019/0075602 A1* | 3/2019 | Lin | H04L 5/0053 |
| 2019/0150155 A1* | 5/2019 | Chatterjee | H04L 1/004 |
| 2020/0154486 A1* | 5/2020 | Cheng | H04L 5/0053 |

OTHER PUBLICATIONS

Jiang D., et al., "Frequency Shifted Frequency Reuse for LTE Heterogeneous Networks", Wireless Communications, Networking and Mobile Computing (WICOM), 2011 7th International Conference on, IEEE, Sep. 23, 2011 (Sep. 23, 2018), XP032059249, 5 Pages, DOI: 10.1109/WICOM.2011.6036643, ISBN: 978-1-4244-6250-6, section III.
International Search Report and Written Opinion—PCT/US2018/031810—ISA/EPO—dated Jan. 30, 2019.

* cited by examiner

SIGNAL MODIFICATION VIA PHASE OR FREQUENCY SHIFTING

CROSS REFERENCE TO RELATED APPLICATIONS & PRIORITY CLAIM

The present application claims priority to and the benefit of the U.S. Provisional Patent Application No. 62/504,451 filed May 10, 2017, which is hereby incorporated by reference in its entirety.

TECHNICAL FIELD

This application relates to wireless communication systems, and more particularly to reducing cell interference by modifying a signal via phase or frequency shifting.

INTRODUCTION

A wireless communication network may include a number of base stations (BSs) that can support communication for a number of user equipments (UEs). In recent years, the developments of electronic, information, sensing, and application technologies cause the Internet to evolve from a human-oriented network, where a person creates and consumes information, into Internet of Things (IoT), where distributed elements exchange and process information. Thus, the demand for serving IoT type wireless data traffic is increasing. For example, smart wireless meters and wireless sensors may be installed throughout buildings in various areas. The smart meters may send meter readings to utilities at some time periods, for example, hourly, daily, or weekly. The sensors may send sensing measurements to servers at some time periods, which may be based on sensing events. IoT application packets are typically small in size, for example, in tens of bytes to about 100 bytes.

Narrowband IoT (NB-IoT) is an emerging cellular technology that provides coverage for a large number of low-throughput low-cost devices with low device power consumption in delay-tolerant applications. A new single tone signal with frequency hopping has been designed for NB-IoT physical random access channel (NPRACH).

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure a method of wireless communication includes applying, by a first wireless communication device, a scrambling sequence associated with a cell to a set of symbol groups in a repetition. The method also includes transmitting, by the first wireless communication device to a second wireless communication device associated with the cell, the set of symbol groups after the applying the scrambling sequence to the set of symbol groups.

A system for wireless communication includes a scrambler that applies a scrambling sequence associated with a cell to a set of symbol groups in a repetition. The system also includes a transceiver that transmits to a first wireless communication device associated with the cell, the set of symbol groups after the scrambling sequence is applied to the set of symbol groups.

In an additional aspect of the disclosure, an apparatus for wireless communication includes means for means for applying a scrambling sequence associated with a cell to a set of symbol groups in a repetition. The apparatus also includes means for transmitting the set of symbol groups after the scrambling sequence is applied to the set of symbol groups.

In an additional aspect of the disclosure, a computer-readable medium having program code recorded thereon, the program code includes code for causing a first wireless communication device, to apply a scrambling sequence associated with a cell to a set of symbol groups in a repetition, and code for causing the first wireless communication device, to transmit to a second wireless communication device associated with the cell, the set of symbol groups after the scrambling sequence is applied to the set of symbol groups.

In an additional aspect of the disclosure, a method of wireless communication includes applying, by a first wireless communication device, a frequency shift associated with a cell to a set of symbol groups in a repetition. The method also includes transmitting, by the first wireless communication device to a second wireless communication device associated with the cell, the set of symbol groups after the frequency shift is applied to the set of symbol groups.

In an additional aspect of the disclosure, a system for wireless communication includes a frequency shifter that applies a frequency shift associated with a cell to a set of symbol groups in a repetition. The system also includes a transceiver that transmits to a first wireless communication device associated with the cell, the set of symbol groups after the frequency shift is applied to the set of symbol groups.

In an additional aspect of the disclosure, an apparatus for wireless communication includes means for applying a frequency shift associated with a cell to a set of symbol groups in a repetition. The apparatus also includes means for transmitting to a first wireless communication device associated with the cell, the set of symbol groups after the applying the frequency shift.

In an additional aspect of the disclosure, a computer-readable medium having program code recorded thereon, the program code includes code for causing a first wireless communication device, to apply a frequency shift associated with a cell to a set of symbol groups in a repetition, and code for causing the first wireless communication device to transmit to a second wireless communication device associated with the cell, the set of symbol groups after the frequency shift is applied to the set of symbol groups.

In an additional aspect of the disclosure, a method of wireless communication includes detecting phase shifts between symbol groups. The method also includes determining whether the difference of two or more phase shifts match a set of expected phase shift values. The method further includes in response to a determination that the difference between one or more phase shifts match a set of expected phase shift values, detecting a signal including the symbol groups. The method also includes in response to a determination that the one or more phase shifts do not match the set of expected phase shift values, ignoring the signal including the symbol groups.

In an additional aspect of the disclosure, a method of wireless communication includes detecting frequency shifts between symbol groups. The method also includes determining whether the difference of two or more frequency shifts match a set of expected frequency shift values. The method further includes in response to a determination that the difference of two or more frequency shifts match a set of expected frequency shift values, detecting a signal including the symbol groups. The method also includes in response to a determination that the one or more frequency shifts do not match the set of expected frequency shift values, ignoring the signal including the symbol groups.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Figure 1:
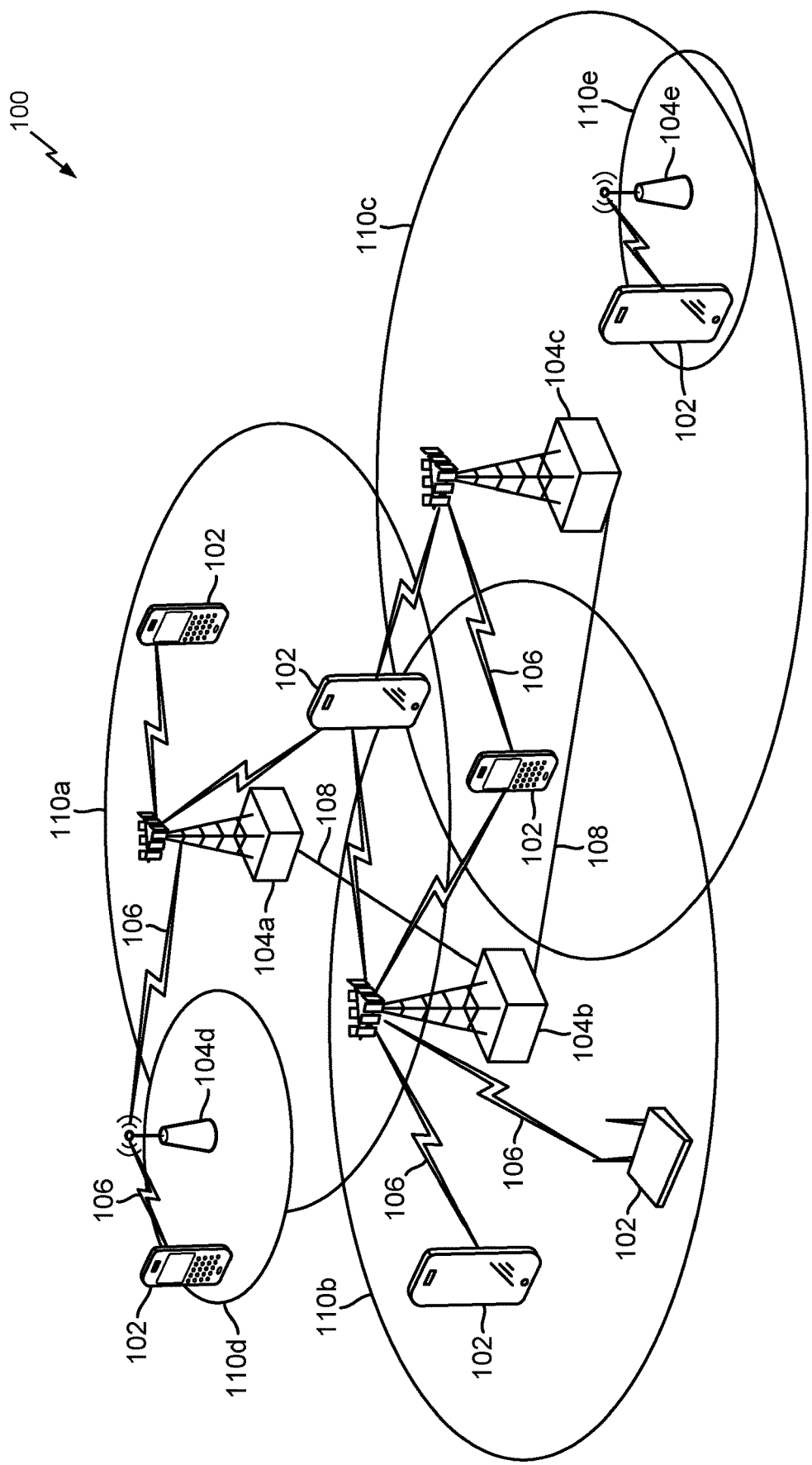
FIG. 1 illustrates a wireless communication network according to embodiments of the present disclosure.

FIG. 1 illustrates a wireless communication network 100 according to embodiments of the present disclosure. The network 100 may include a number of UEs 102 as well as a number of BSs 104. The BSs 104 may include an Evolve Node B (eNodeB). A BS 104 may be a station that communicates with the UEs 102 and may also be referred to as a base transceiver station, a node B, an access point, and the like.

The BSs 104 communicate with the UEs 102 as indicated by communication signals 106. A UE 102 may communicate with the BS 104 via an uplink (UL) and a downlink (DL). The downlink (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108.

The UEs 102 may be dispersed throughout the network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104a, 104b and 104c are examples of macro BSs for the coverage areas 110a, 110b and 110c, respectively. The BSs 104d and 104e are examples of pico and/or femto BSs for the coverage areas 110d and 110e, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, the network 100 can be a LTE network. Reference signals are pre-determined signals that facilitate the communications between the BSs 104 and the UEs 102. For example, a reference signal can have a particular pilot pattern or structure, where pilot tones may span across an operational bandwidth or frequency band, each positioned at a pre-defined time and a pre-defined frequency. Control information may include resource assignments and protocol controls. Data may include protocol data and/or operational data.

In an embodiment, the UE 102 may contain a USIM (Universal Subscriber Identity Module) that represents the International Mobile Subscriber Identity (IMSI) and stores the corresponding authentication credentials. This IMSI is used to identify an LTE user (generally referred to as "subscriber" in 3GPP terminology) uniquely. The USIM may participate in LTE subscriber authentication protocol and generate cryptographic keys that form the basis for the key hierarchy subsequently used to protect signaling and user data communication between the UE 102 and BSs 104 over the radio interface.

In an embodiment, the BSs 104 control one or more cells and can broadcast system information associated with the network 100. Some examples of system information may include physical layer information such as cell bandwidths and frame configurations, cell access information, cell identifier (ID), and neighbor cell information. A UE 102 can access the network 100 by listening to the broadcast system information and requests connection or channel establishments with a BS 104. For example, the UE 102 can perform a random access procedure to begin communication with the BS 104 and subsequently may perform connection and/or registration procedures to register with the BS 104. After completing the connection and/or the registration, the UE 102 and the BS 104 can enter a normal operation stage, where operational data may be exchanged. The BS 104 may assign a UE ID to the UE 102 for identifying the UE 102 in the network 100. The data exchange between the BS 104 and the UE 102 during the normal operation may be based on the assigned UE ID.

The UE 102 downloads the system information and uses the system information to successfully communicate with the network. In an embodiment, the BS 104 broadcasts system information, for example, in the form of master information blocks (MIBs) and/or system information blocks (SIBs). The system information may include cell access related information, a channel configuration, a physical random access (PRACH) configuration, cell ID, and/or neighboring cell information. The UE 102 may receive the cell ID of a particular cell via SIB messages or MIB messages.

Figure 2:
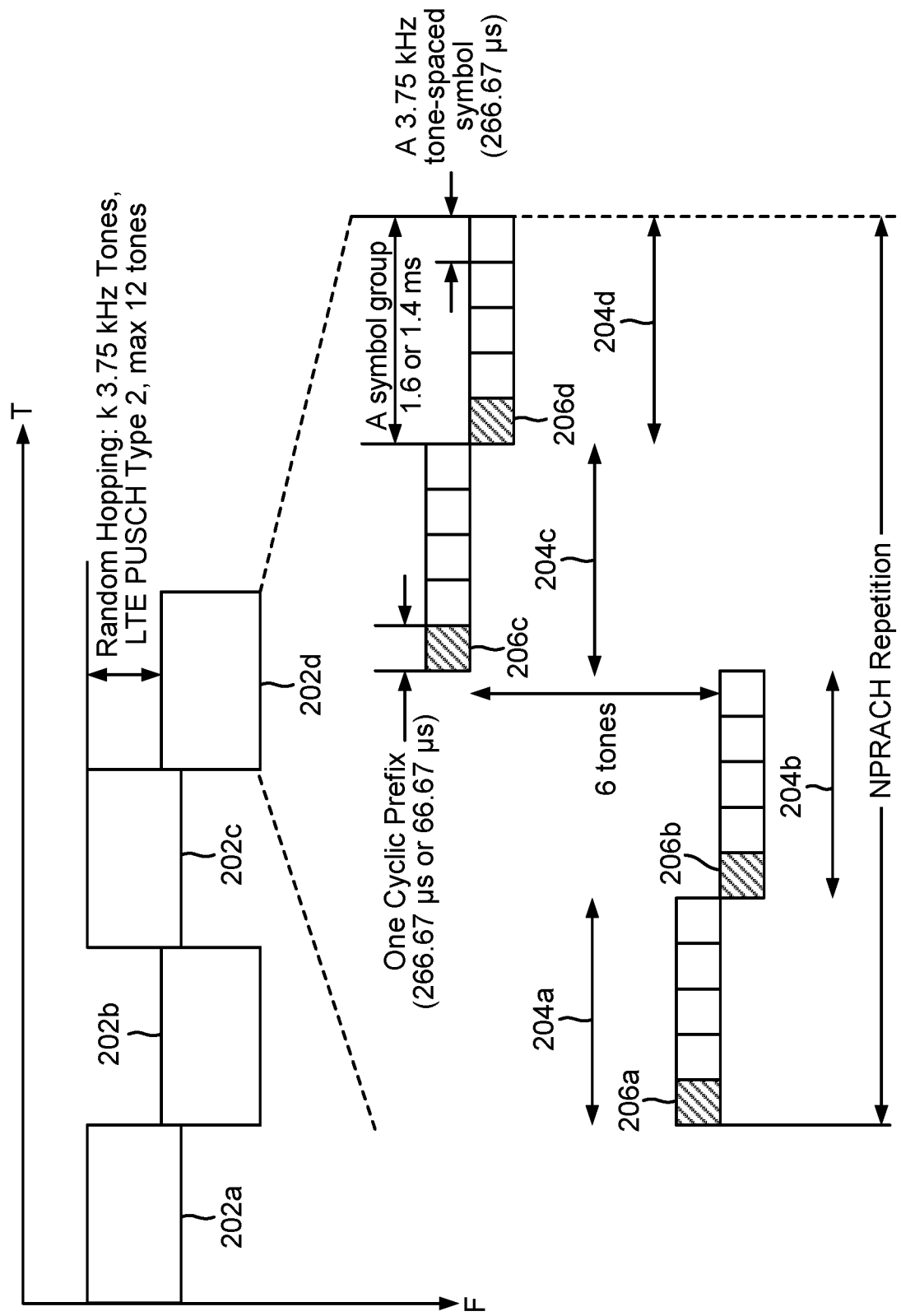
FIG. 2 illustrates an NPRACH signal including four repetitions.

NB-IoT may include one or more NPRACH signals. FIG. 2 illustrates an NPRACH signal including four repetitions 202. The number of repetitions 202 may be configurable and depend on the coverage level, the distance between the UE 102 and the cell, etc. In FIG. 2, each repetition 202 includes four symbol groups 204, and each symbol group 204 includes a cyclic prefix 206 and five contiguous same-valued symbols at a given 3.75 kHz tone. Each symbol group may be a NPRACH symbol group. The length of cyclic prefix 206 may be 66.67 µs for a cell radius up to 10 km and 266.67 µs for a cell radius up to 40 km. In some embodiments, each symbol group includes a group of symbols, each symbol being a single tone transmission.

The NPRACH signal may repeat between each repetition 202, and frequency hopping may occur between repetitions. NPRACH signals associated with different cells may be differentiated by cell-specific random hopping between repetitions. For a coverage level with one repetition, a NPRACH signal received by cell A may be exactly the same as a NPRACH signal received by cell B. The UE 102 may randomly hop between repetitions, and the random hopping may be defined per cell. In this example, the UE 102 may provide for cell-specific specific random hopping between repetitions. The frequency hopping may be cell dependent in that the UE 102 may apply a formula, which is a function of the cell ID, to determine the frequency hopping. In an embodiment, the eNodeB may differentiate one signal intended for one cell from another via the hopping pattern because the eNodeB is self-aware of its own hopping pattern.

In addition to frequency hopping between repetitions, the UE 104 may apply frequency hopping to symbol groups. In some embodiments, the frequency hopping between symbol groups may be defined in the specification and fixed for all of the cells. In some embodiments, the frequency hopping between symbol groups may be provided for in synchronization information. The tone frequency index may change from one symbol group to another symbol group. For example, the hop distance from symbol group 204a to symbol group 204b is 1 (may be +1 or −1), and associated with a frequency of 3.75 kHz. The hop distance from symbol group 204b to symbol group 204c is 6 (may be +6 or −6), associated with a frequency of 6×3.75 kHz. The hop distance from symbol group 204c to symbol group 204d is 1 (may be +1 or −1), associated with a frequency of 3.75 kHz. The five symbols in symbol group 204 may be consistently modulated by a constant value (e.g., 1). In some examples, the five symbols represent a sinusoidal signal with the frequency being an integer of a multiple of 0.75 kHz.

The positive or negative nature of the frequency hop distance (e.g., +1, −1, +6, and −6) may depend on the starting tone of the frequency location, which may be randomly chosen by the UE 102. If the hop distance from symbol group 204a to symbol group 204b is +1 and the hop distance from symbol group 204c to symbol group 204d is +1, then the phase difference between symbol group 204a and symbol group 204b and the phase difference between symbol group 204c and symbol group 204d should be exactly the same in the absence of frequency offset because their distance in frequency remains the same. If, however, the hop distance for symbol group 204a to symbol group 204b is +1 and the hop distance from symbol group 204c to symbol group 204d is −1, then the phase difference between symbol group 204a and symbol group 204b and the phase difference between symbol group 204c and symbol group 204d should be conjugate to each other. Similarly, if the hop distance for symbol group 204a to symbol group 204b is −1 and the hop distance from symbol group 204c to symbol group 204d is +1, then the phase difference between symbol group 204a and symbol group 204b and the phase difference between symbol group 204c and symbol group 204d should also be conjugate to each other. Additionally, if the UE 102 applies a phase shift to symbol group 204d, then the previous cases in which the phase differences are the same or conjugate to each other will no longer hold.

Under the NPRACH design, the random access is the same for all cells. The UE 102's random access to a cell, however, may have some disadvantages. For example, the random access signal is the same for all cells, and a cell may detect NPRACH signals intended for another cell. NB-IoT covers a large geographical area, and the NB-IoT NPRACH design may suffer from false alarms due to inter-cell interference. For example, a cell A may suffer from interferences from one or more random access intended for a cell B, which may be referred to as a false alarm and may cause problems. Additionally, the random access may cause inter-cell interference between cells A and B. If cells A and B have NPRACH resources completely or partially overlapped in time, a NPRACH signal intended for one cell may be detected by another cell, particularly when the number of repetitions is small. In addition, the timing estimation of a random access of cell A may be biased due to interference from one or more random access signals intended for other cells. It may be desirable to reduce false alarms and/or inter-cell interference.

Additionally, UEs may already be programmed to transmit NPRACH signals in a particular way. The present disclosure provides techniques for "new" UEs to modify NPRACH signals and transmit these modified signals to cells such that the signals are not detected by unintended cells. It may be desirable to provide these new UEs with backward compatibility to communicate with components in the network 100 and send the NPRACH signals disclosed in the present disclosure.

Figure 3:
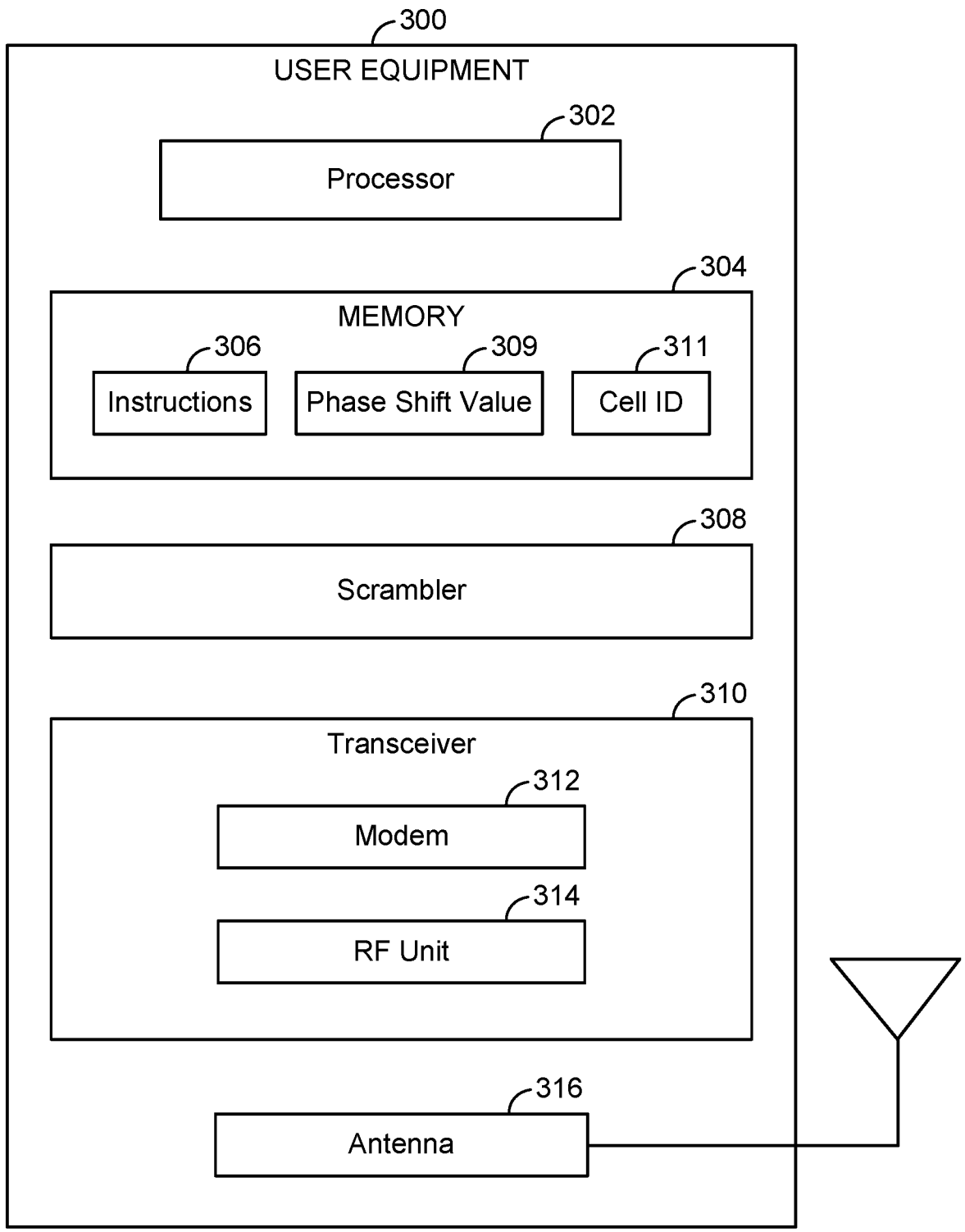
FIG. 3 is a block diagram of an exemplary user equipment (UE) that scrambles symbol groups included in a repetition according to embodiments of the present disclosure.

FIG. 3 is a block diagram of an exemplary UE 300 that scrambles a set of symbol groups included a repetition according to embodiments of the present disclosure. The UE 300 may be a UE 102 as discussed above. As shown, the UE 300 may include a processor 302, a memory 304, a scrambler 308, a transceiver 310 including a modem subsystem 312 and a RF unit 314, and an antenna 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Additionally, the memory 304 may store a cell ID 311 received by the UE 300 and used by the UE 300 to apply the techniques discussed in the present disclosure (e.g., to scramble or frequency shift). The cell ID 311 may identify the cell with which the UE 300 is connected and has been authenticated. The cell may include its cell ID 311 in the synchronization information, and the UE 300 may receive the synchronization information and store the cell ID 311 into the memory 304.

The scrambler 308 may be used for various aspects of the present disclosure. The scrambler 308 may reduce inter-cell interference and the occurrence of false alarms. The scrambler 308 may apply a scrambling sequence at the symbol group level. For example, the scrambler 308 may scramble a set of four symbol groups 204a, 204b, 204c, and 204d in the repetition 202d by a sequence of length four. The scrambling may be done based on the cell ID defined by the specification, or may be explicitly signaled in the system information. The scrambler 308's use of a scrambling sequence on the symbol groups may be cell specific. For example, scrambler 308 may identify the scrambling sequence associated with the cell ID 311, and apply that particular scrambler 308 sequence to the set of symbol groups. The cell ID 311 may be associated with the phase shift value 309, which provides information to the scrambler 308 on the angle of the phase shift. If the UE 300 connects to another cell, the cell ID 311 may be updated to the new cell's cell ID and the phase shift value 309 may be updated to reflect the new cell's phase shift value. Different cells may use different scrambling sequences. Additionally, different repetitions in a cell may have the same or different scrambling sequences, and different NPRACH resources may have different or the same scrambling sequence. The scrambler 308 may apply different scrambling sequences at the symbol group levels.

In some embodiments, the sequences that are applied are associated with the network and the particular UE, and the scrambler 308 applies different scrambling sequences among different repetitions. The scrambling sequence may be dependent on the cell (e.g., predefined based on the cell ID). After the cell is defined, a particular scrambling sequence may be defined for all the repetitions. In an example, four repetitions and four scrambling sequences (e.g., 1, 2, 3, 4) are defined. For the cell identified by the cell ID 311, the UE 300 may use sequence 1, 2, 3, 4 for repetitions 1, 2, 3, 4. In this example, for repetition 1, the scrambler 308 may apply scrambling sequence 1 based on the cell ID 311; for repetition 2, the scrambler 308 may apply scrambling sequence 2 based on the cell ID 311, for repetition 3, the scrambler 308 may apply scrambling sequence 3 based on the cell ID 311; and for repetition 4, the scrambler 308 may apply scrambling sequence 4 based on the cell ID 311. For a second cell identified by a second cell ID different from the cell ID 311, the UE 300 may use the sequence 2, 3, 4, 1 for repetition 1, 2, 3, 4. In this example, for repetition 1, the scrambler 308 may apply scrambling sequence 2 based on the second cell ID; for repetition 2, the scrambler 308 may apply scrambling sequence 3 based on the second cell ID; for repetition 3, the scrambler 308 may apply scrambling sequence 4 based on the second cell ID; and for repetition 4, the scrambler 308 may apply scrambling sequence 1 based on the second cell ID. In an example, all repetitions use the same sequence. For example, the scrambler 308 may apply scrambling sequence 1, 1, 1, 1 for all 4 repetitions.

In some embodiments, a scrambling sequence includes entries of a constant absolute value. In order to not change the signal strength between symbol groups so that all four symbol groups have the exact same strength. In this example, the magnitude remains the same, and the scrambler 308 may apply a scrambling sequence by applying a phase shift to one or more of the symbol groups, thus changing the phase among one or more of the four symbol groups. Although the disclosure may provide examples of the phase shifting being applied to four symbol groups, it should be understood that other examples provide for application of a scrambling sequence being applied to more than or fewer than four symbol groups. The term "phase rotation" and "phase shifting" may be used interchangeably.

In some examples, the phase shift signal may be written in exponential form as follows:

$$\text{Signal} = \exp(j*s(n)), \qquad \text{Equation (1)}$$

where n=1, 2, 3, 4, s(n) represents the phase shift for symbol group n, and j=square root of (−1). If the phase shift s(n)=π/2, the scrambler 308 shifts or rotates the signal by this phase shift value (e.g., π/2). In an example, the scrambler 308 may apply Equation (1) to the symbol group n and transmit this signal to the BS 104. In some examples, scrambler 308 applies the scrambling sequence to symbol groups 204a, 204b, 204c, and 204d by rotating a symbol group 204a by a first value listed in the scrambling sequence (e.g., 0), rotating symbol group 204b by a second value listed in the scrambling sequence (e.g., π/2), rotating symbol group 204c by a third value listed in the scrambling sequence (e.g., π), and rotating symbol group 204d by a fourth value listed in the scrambling sequence (e.g., 3π/2).

Equation (1) may be further simplified as shown in the following Equation (2):

$$\text{Phase rotation} = s(n), \qquad \text{Equation (2)}$$

where n=1, 2, 3=0. In this example, s(n) has the value zero for the first three symbols and thus the scrambler 308 does not apply a phase rotation to symbol groups 1, 2, and 3 because they are rotated by zero. The scrambler 308 may apply a phase shift rotation to symbol group 4. For example, if s(n)=π/2, the scrambling sequence may be in the form [0, 0, 0, π/2*π], and the scrambler 308 rotates the last symbol group 4 with possible values [0, π/2, π, and 3π/2]. In an example, the scrambler 308 may apply a phase rotation given by Equation (2) to the symbol group n and transmit this signal to the BS 104.

Application of the scrambling sequence may provide for a robust scheme that provides for signal reuse. The robustness of the scheme may depend on the phase shift of the angle. For example, referring to Equation (2) with n=4, the distance is in the angle. In an example, the four values [0, π/2, π and 3π/2] are defined for symbol group 4 and no phase shift for other symbol groups, and the distance between each of the possible values is π/2, which defines the robustness of the scheme. Cell A and three other cells near cell A may use different defined values relative to each other, due to their proximity. The cells further out, however, may reuse the value used by cell A. Additionally, if the number of defined values goes beyond four, another scrambling scheme may be provided.

The memory 304 may store one or more phase shift values 309, which may provide the UE 300 with information on how much to shift the phase of a signal (e.g., NPRACH signal). A phase shift value 309 may be provided in a variety of ways. In an example, the phase rotation or phase shift value 309 is defined in the specification as a function of the cell ID. In this example, four values may be defined for the phase shift value 309. If the cell IDs have already been assigned, it may be advantageous to provide a more flexible avenue for the UE 300 to obtain the phase shift value 309 of a cell. In another example, the cell provides its cell ID in synchronization information. The synchronization information may be, for example, a SIB message or MID message. The UE 300 may synchronize with the cell and attach the synchronization information (e.g., the SIB or MID information) to determine the value of the phase shift value 309 (e.g., π/2). In some examples, the phase shift value 309 is provided both in the specification and also in the synchronization information. In an example, the specification may define 32 values from 0 to $2\pi$, and some phase shift values 309 are provided in the synchronization information. Accordingly, the scrambler 308 may provide the UE 300 with a mechanism to reduce false alarms and inter-cell interference within the network 100.

As shown, the transceiver 310 may include the modem subsystem 312 and the RF unit 314. The transceiver 310 can be configured to communicate bi-directionally with other devices, such as the BSs 104. In some examples, the modem subsystem 312 may be configured to communication with the scrambler 308 and modulate and/or encode the data from the memory 304 according to the scrambling scheme. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 102 or a BS 104. Although shown as integrated together in transceiver 310, the modem subsystem 312 and the RF unit 314 may be separate devices that are coupled together at the UE 300 to enable the UE 300 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of a random access preamble, a connection request, or a NPRACH signal that has been modified by scrambler 308 according to embodiments of the present disclosure. The antenna 316 may further receive data messages transmitted from other devices. The antenna 316 may provide the received data messages for processing and/or demodulation at the transceiver 310. Although FIG. 3 illustrates antenna 316 as a single antenna, antenna 316 may include multiple antennas of similar or different designs in order to sustain multiple transmission links. The RF unit 314 may configure the antenna 316.

Using the scrambling sequence techniques provided in the present disclosure, a cell may be better able to differentiate between which signals are intended for it versus intended for another cell. At the eNodeB, a manner of determining whether a NPRACH signal is intended for another cell is to detect the phase shifts between symbol groups (e.g., symbol groups 1 and 2, and symbol groups 3 and 4) and determine whether this phase shift is associated with (or assigned to) the cell. For example, cell A may be identified by cell ID 311 and be associated with a phase shift value 309 "$\pi/2$." If cell A determines that the difference between symbol groups 204a and 204b is a degrees and the difference between symbol groups 204c and 204d is close to $\alpha+\pi/2$ degrees, cell A may determine that this received NPRACH signal is intended for the cell. In this example, cell A is aware that the UE 102 rotates the last symbol group by a certain degree (e.g., $\pi/2$), and the symbol group is rotated or its phase is shifted as cell A expects it to be. If, however, cell B is not associated with a phase shift value of "$\pi/2$," this NPRACH signal is not intended for cell B and cell B will not detect this NPRACH signal or discard this repetition in timing estimation. In this example, cell B may listen for signals that are associated with a phase shift value of zero.

Figure 4:
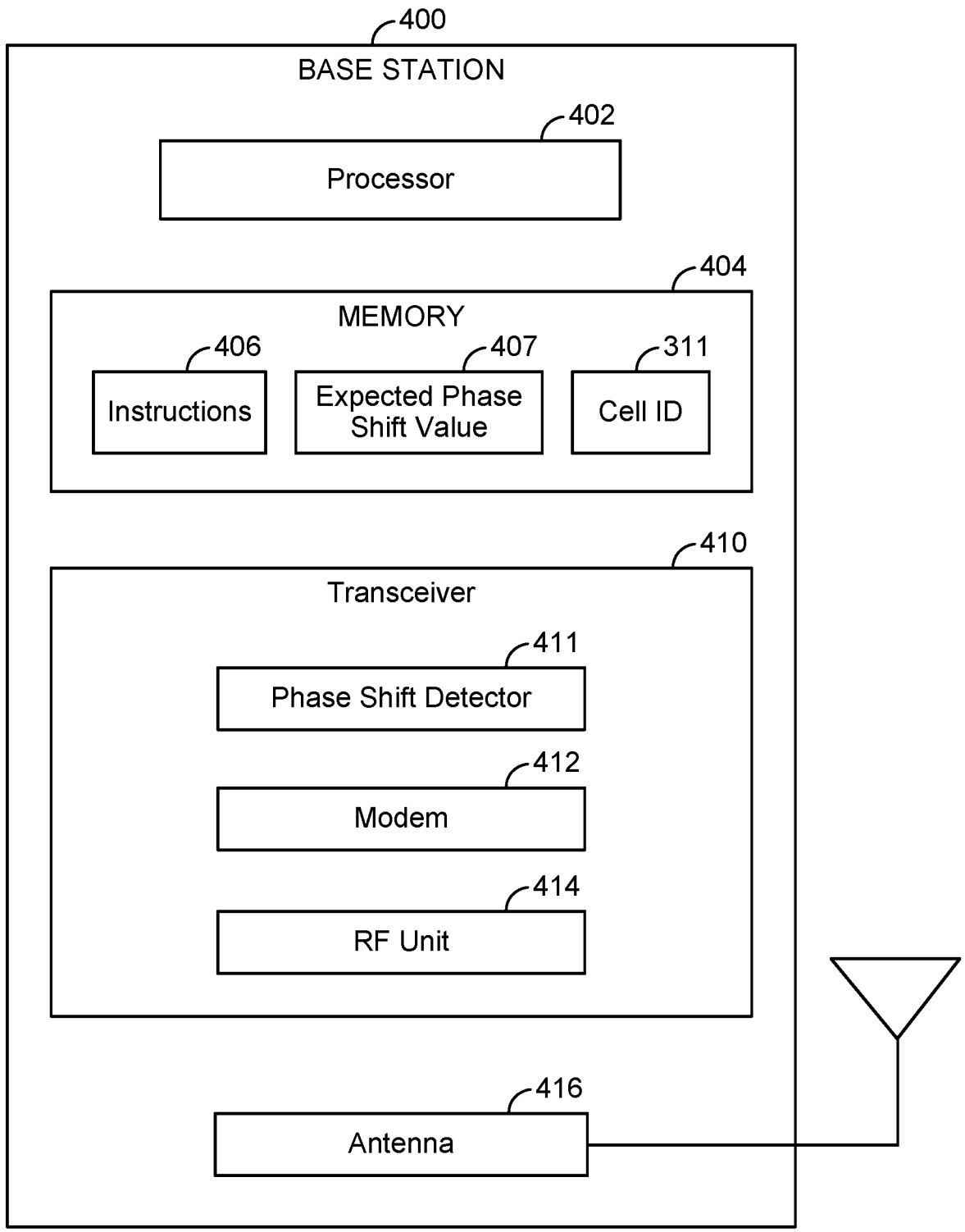
FIG. 4 is a block diagram of an exemplary base station (BS) that detects phase shifts in a signal according to embodiments of the present disclosure.

FIG. 4 is a block diagram of an exemplary BS 400 that detects phase shifts in a signal according to embodiments of the present disclosure. In an example, the signal is a NPRACH signal. The BS 400 may be a BS 104 as discussed above. As shown, the BS 400 may include a processor 402, a memory 404, a transceiver 410 including a phase shift detector 411, modem subsystem 412 and a RF unit 414, and an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 3.

Additionally, the memory 404 may store one or more expected phase shift value values 407 associated with (or assigned to) the current cell and may further store the cell ID 311 of a cell to which the UE 300 is connected. The current cell refers to the cell with which the UE 300 is connected. The expected phase shift value 407 may be configurable. The cells adjacent to the current cell may store different expected phase shift values than the current cell in order to reduce confusion and inter-call interference. The memory 404 may also store the cell's cell ID 311, which identifies and provides information about the cell.

As shown, the transceiver 410 may include the phase shift detector 411, the modem subsystem 412, and the RF unit 414. The transceiver 410 can be configured to communicate bi-directionally with other devices, such as the UEs 102 and 302 and/or another core network element. The phase shift detector 411 may be used for various aspects of the present disclosure. The phase shift detector 411 may reduce inter-cell interference and the occurrence of false alarms. For example, the phase shift detector 411 may detect the phase shifts between symbol groups and determine whether the difference of these detected phase shifts are associated with or match the one or more expected phase shift values 407. In an example, phase shift detector 411 detect phase shifts between symbol groups 204a and 204b and between symbol groups 204c and 204d, and determines whether the difference of these detected phase shifts match an expected phase shift value. In response to a determination that the one or more detected phase shifts match a set of expected phase shift values, phase shift detector 411 may detect a signal including the symbol groups. In this example, the cell is the intended cell for the signal. In response to a determination that the differences of one or more detected phase shifts do not match the set of expected phase shift values, phase shift detector 411 ignores the signal including the symbol groups. In this example, the cell is not the intended cell for the signal.

The modem subsystem 412 may be configured to modulate and/or encode data. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102. Although shown as integrated together in transceiver 410, the modem subsystem 412 and the RF unit 414 may be separate devices that are coupled together at the BS 104 to enable the BS 104 to communicate with other devices.

The RF unit 414 may provide the modulated and/or processed data, e.g. data packets (or, more generally, data messages that may contain one or more data packets and other information), to the antenna 416 for transmission to one or more other devices (e.g., the UE 300). This may include, for example, transmission of information to complete attachment to a network (e.g., cell ID) according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
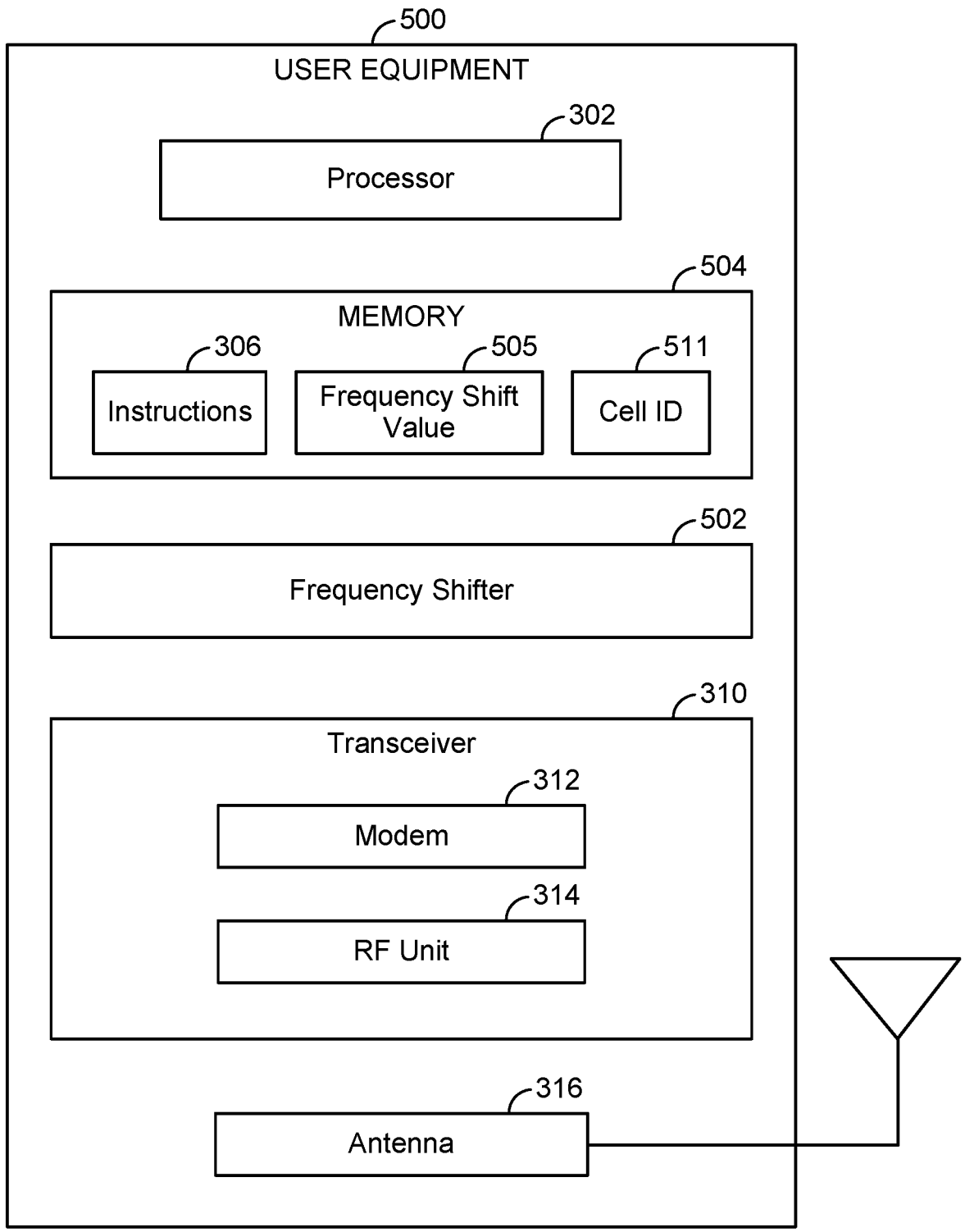
FIG. 5 is a block diagram of an exemplary UE that applies frequency shifting to a signal according to embodiments of the present disclosure.

FIG. 5 is a block diagram of an exemplary UE 500 that applies frequency shifting to a signal according to embodiments of the present disclosure. In an example, the signal is a NPRACH signal. The UE 500 may be a UE 102 or UE 300 as discussed above. As shown, the UE 500 may include a processor 302, a memory 504, a frequency shifter 502, a transceiver 310 including a modem subsystem 312 and a RF unit 314, and an antenna 316. These elements may be in direct or indirect communication with each other, for example via one or more buses. The memory 504 may store one or more frequency shift values 505.

In some embodiments, the frequency shifter 502 applies one or more frequency shifts to existing NPRACH signals before transmitting them to BS 104. In an example, each symbol group 204 is a signal of an integer multiple of 0.75 kHz, and two NPRACH signals allocated at tone k with frequency shifts of m1*0.75 kHz and m2*0.75 kHz are orthogonal to each other. In this example, there are five possible frequency shift values so that NPRACH signals with different shift values are mutually orthogonal to each other. The five possible shift values may be [−2, −1, 0, 1, 2]*0.75 kHz, which correspond to tone locations in FIG. 6.

Figure 6:
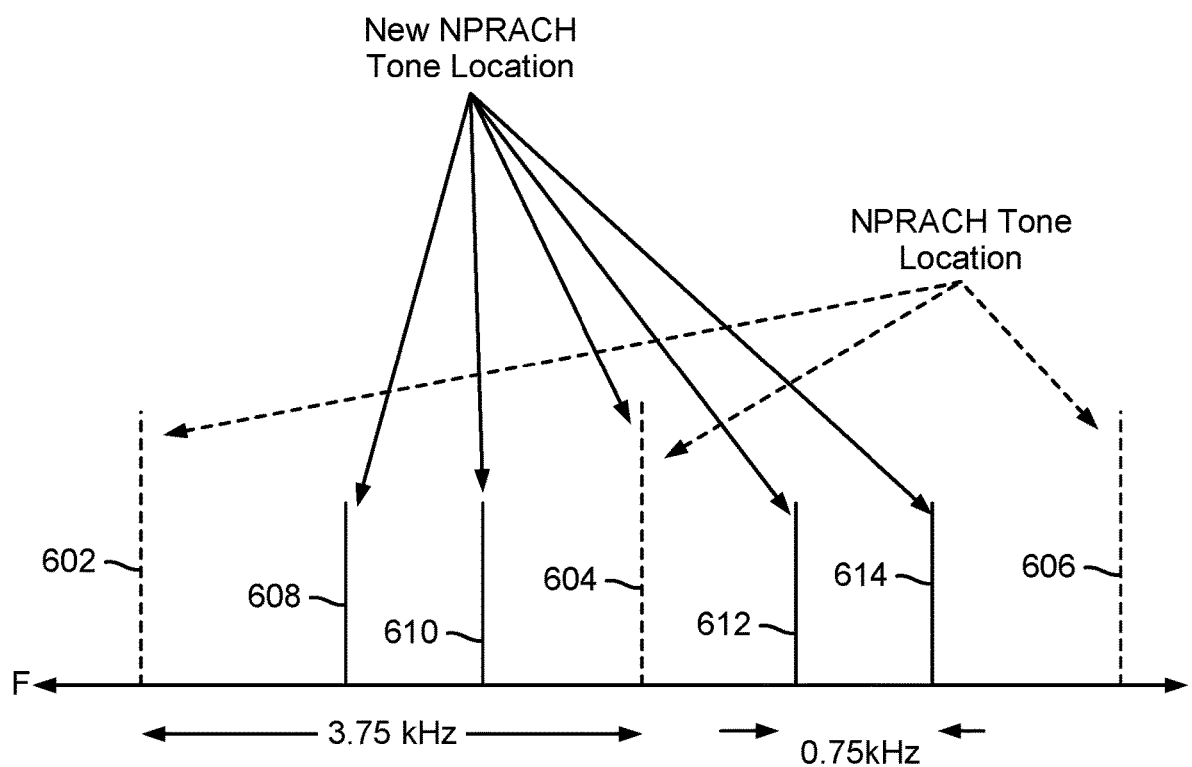
FIG. 6 is a diagram of a NPRACH signal with a frequency shift-frequency grid according to embodiments of the present disclosure.

FIG. 6 is a diagram of a NPRACH signal with a frequency shift-frequency grid according to embodiments of the present disclosure. In FIG. 6, the X-axis represents the frequency. The NPRACH tone locations 602, 604, and 606 may represent the current specification, or what is currently available. For each symbol group, the UE 500 may select one of tone locations 602, 604, and 606 at a specified frequency, and sends five symbols of them. The transmitted signal is the duration of that signal, which is one period of 0.75 kHz. The new NPRACH tone locations 604, 608, 610, 612, and 614 may represent the new NPRACH tone locations that are added. Each of the new NPRACH tone locations is 0.75 kHz apart from each other, and the NPRACH tone locations 602, 604, and 606 and the new NPRACH tone locations 604, 608, 610, 612, and 614 are frequency locations. The tone locations may represent frequency locations and are based on the specification, which provides a five symbol duration of 3.75 kHz; these signals will be orthogonal to each other.

In an example, if the UE 500 desires to send a symbol group using the new NPRACH tone location 604, the UE 500 may shift the signal to the right by 0.75 kHz, resulting in this signal being orthogonal to any signals sent using the other tone locations. For a cell B, the frequency shifter 502 may then use the new NPRACH tone location 612, which is located to the right of the NPRACH tone location 604. Additionally, for another cell C, the frequency shifter 502 may use another tone location. For each of the NPRACH tone locations 602, 604, and 606, five more new NPRACH tone locations at 3.75 kHz/5=0.75 kHz may be provided. Although the new NPRACH tone locations 604, 608, 610, 612, and 614 are plotted around the initial NPRACH tone locations, this is not intended to be limiting, and may be plotted in accordance with other factors.

Existing UEs may have a frequency shift value 505 of zero regardless of its intended cells. This zero value corresponds to the current frequency location, and the existing UEs may be unable to understand anything else in terms of the frequency shift value 505. In an example of backwards compatibility, the new UEs 500 may use one of the five defined frequency shift values fd1=[−2, −1, 0, 1, 2]*0.75 kHz or zero (because the old UEs may use zero). In another example, the new UEs 500 may use one of the four defined frequency shift values fd2=[−2, −1, 1, 2]*0.75 kHz, which can be assigned to a cell depending on its cell ID. For instance, entry mod(cell_ID,5)+1 of fd1 or entry mod(cell_ID,4)+1 of fd2 may be used, which may allow for a frequency reuse factor of 5 or 4, i.e., 5 or 4 cells can have different frequency for NPRACH.

If two cells are assigned different frequency shift values, the NPRACH signals of these two cells may be orthogonal to each other, depending on how they overlap or collide in time. For example, a NPRACH resource of cell A may exactly coincide with NPRACH resource of cell B in both frequency and time, but this may represent the worst case. In this example, the NPRACH resource happens at the same time and same frequency location. If this is the case, frequency shifter 502 may apply the frequency shifting and if the two cells have different frequency shift values, they will be orthogonal to each other. Accordingly, this may reduce the inter-cell interference. If NPRACH resource of cell A and cell B partially overlap in time, this may not cause a huge concern. Although the signals will not be exactly orthogonal, the interference may be small because the signals will be associated with different frequency locations and they overlap only partially in time.

The frequency shift values 505 may be provided in a variety of ways. In an example, the frequency shift value 505 is defined in the specification as a function of the cell ID and may thus be fixed based on the cell ID. In this example, it may be desirable for operators to consider this formula when assigning cell IDs to allow efficient use of these frequency shifting techniques. In another example, the frequency shift value 505 is provided in the synchronization information.

Although the disclosure may discuss NB-IoTs, the disclosure is not so limited. In general, assuming that the hopping distance is an integer multiple of FH Hz, which is a value, and M symbols (each having a duration of 1/FH) per symbol group (a contiguous transmission without frequency change), M shifts can be created with frequency shifts m*FH/M Hz, where m=0, . . . M−1.

Figure 7:
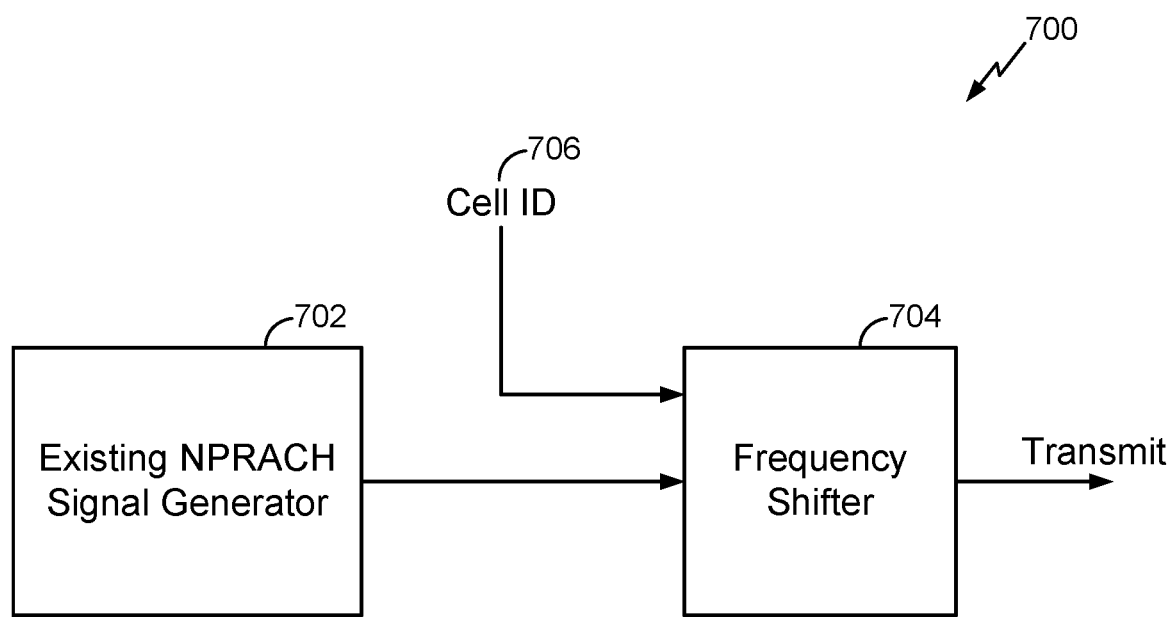
FIG. 7 is a block diagram according to embodiments of the present disclosure.

FIG. 7 is a block diagram 700 according to embodiments of the present disclosure. FIG. 7 includes an existing NPRACH signal generator 702 and a frequency shifter 704, which may correspond to frequency shifter 502. The existing NPRACH signal generator 702 may be incorporated into the UE 500 and may generate NPRACH signals in accordance with the NPRACH tone locations 602, 604, and 606. The frequency shifter 704 may take as input the cell ID 706 of a cell and one or more NPRACH tone locations 602, 604, and 606, and apply frequency shifting accordingly. Afterward, frequency shifter 704 may transmit the resulting NPRACH signal to, for example, BS 104. The resulting NPRACH signal may have a frequency of, for example, the new NPRACH tone location 612 in shown in FIG. 6.

Figure 8:
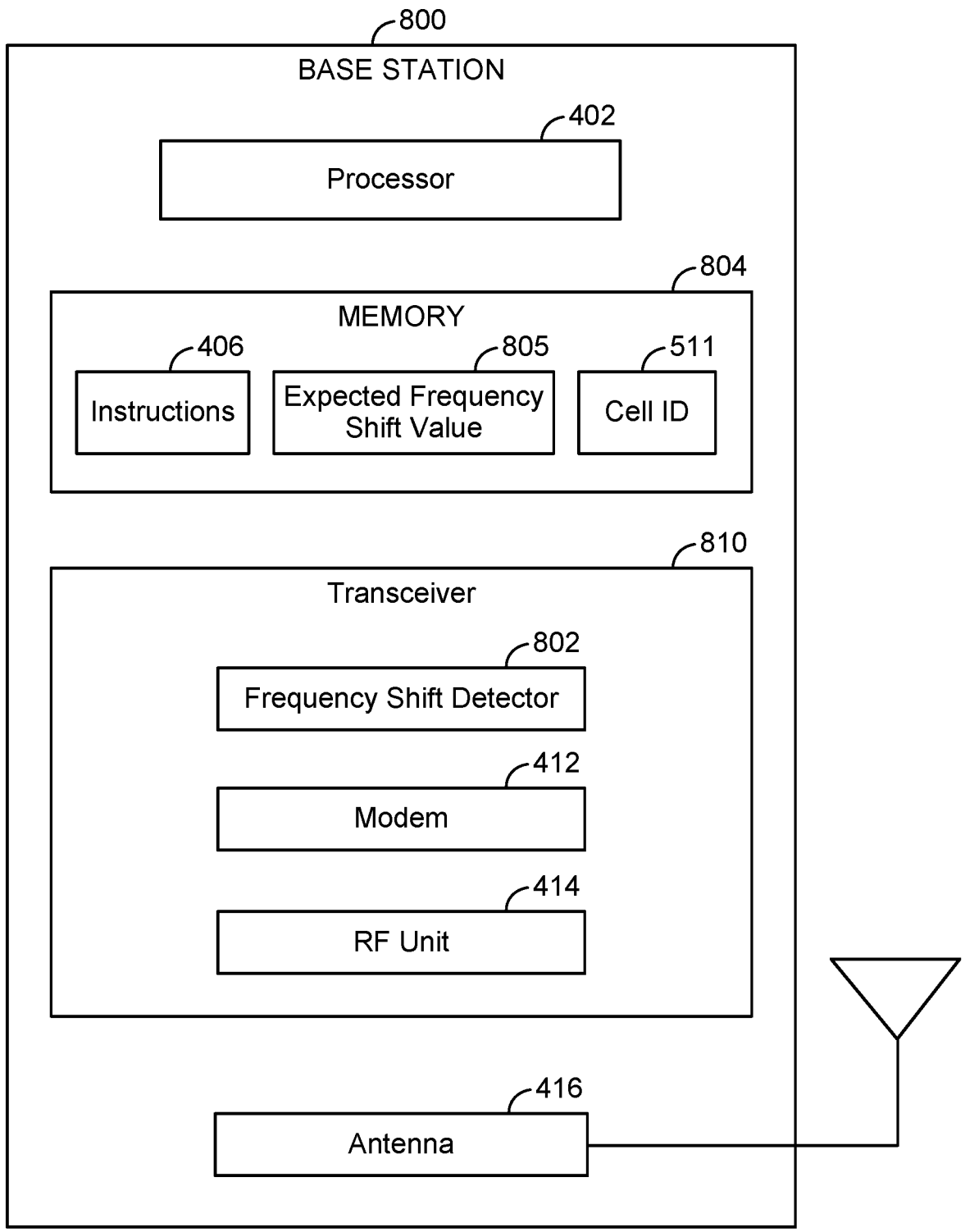
FIG. 8 is a block diagram of an exemplary BS that detects frequency shifts in a signal according to embodiments of the present disclosure.

FIG. 8 is a block diagram of an exemplary BS 800 that detects frequency shifts in a signal according to embodiments of the present disclosure. The BS 800 may be a BS 104 as discussed above. As shown, the BS 800 may include a processor 402, a memory 804, a transceiver 810 including a frequency shift detector 802, modem subsystem 412 and a RF unit 414, and an antenna 416. These elements may be in direct or indirect communication with each other, for example via one or more buses.

Additionally, the memory 804 includes an expected frequency shift value 805 and the cell ID 511 of a cell to which the UE 700 is connected. The frequency shift detector 802 may be used for various aspects of the present disclosure. For example, the frequency shift detector 802 detects the frequency shifts between symbol groups and determines whether the difference of these detected frequency shifts are associated with or match the expected frequency shift value 805. In an example, the frequency shifter 502 detects frequency shifts between symbol groups and determines whether the differences of two or more detected frequency shifts match a set of expected frequency shift values. In response to a determination that the one or more detected frequency shifts match a set of expected frequency shift values, the frequency shifter 502 detects a signal including the symbol groups. In response to a determination that the differences of two or more detected frequency shifts do not match the set of expected frequency shift values, the frequency shifter 502 ignores the signal including the symbol groups.

It should be understood that although the UE 300 is illustrated as including scrambler 308 and phase shift value 309, the UE 300 may also include other components. For example, in some embodiments, the UE 300 also includes the frequency shifter 502 and one or more frequency shift values 505. In some embodiments, the BS 400 also includes the frequency shift detector 802, the one or more expected frequency shift values 804, and the cell ID 511. In some embodiments, the immediate neighbor cells have different expected frequency shift values, and second tier neighbor cells have different scrambling sequences.

Figure 9:
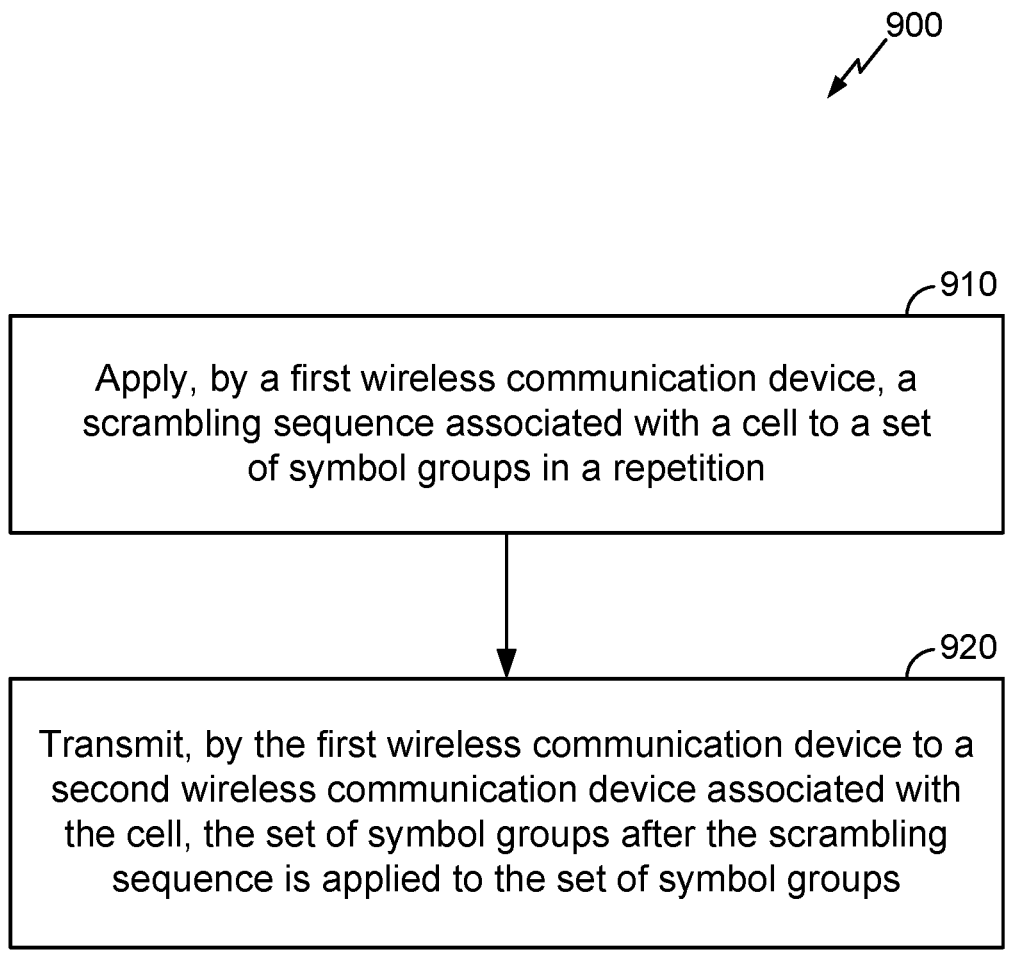
FIG. 9 is a flow diagram of a method of modifying a signal by scrambling a set of symbol groups according to embodiments of the present disclosure.

FIG. 9 is a flow diagram of a method 900 of modifying a signal by scrambling a set of symbol groups according to embodiments of the present disclosure. Steps of the method 900 can be executed by a computing device (e.g., a processor, processing circuit, and/or other suitable component) of a wireless communication device, such as the UEs 102, 300, and 500. The method 900 may employ similar mechanisms as described with respect to the network 100. The method 900 can be better understood with reference to FIG. 2. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes applying, by a first wireless communication device, a scrambling sequence associated with a cell to a set of symbol groups in a repetition. At step 920, the method 900 includes transmitting, by the first wireless communication device to a second wireless communication device associated with the cell, the set of symbol groups after the scrambling sequence is applied to the set of symbol groups.

Figure 10:
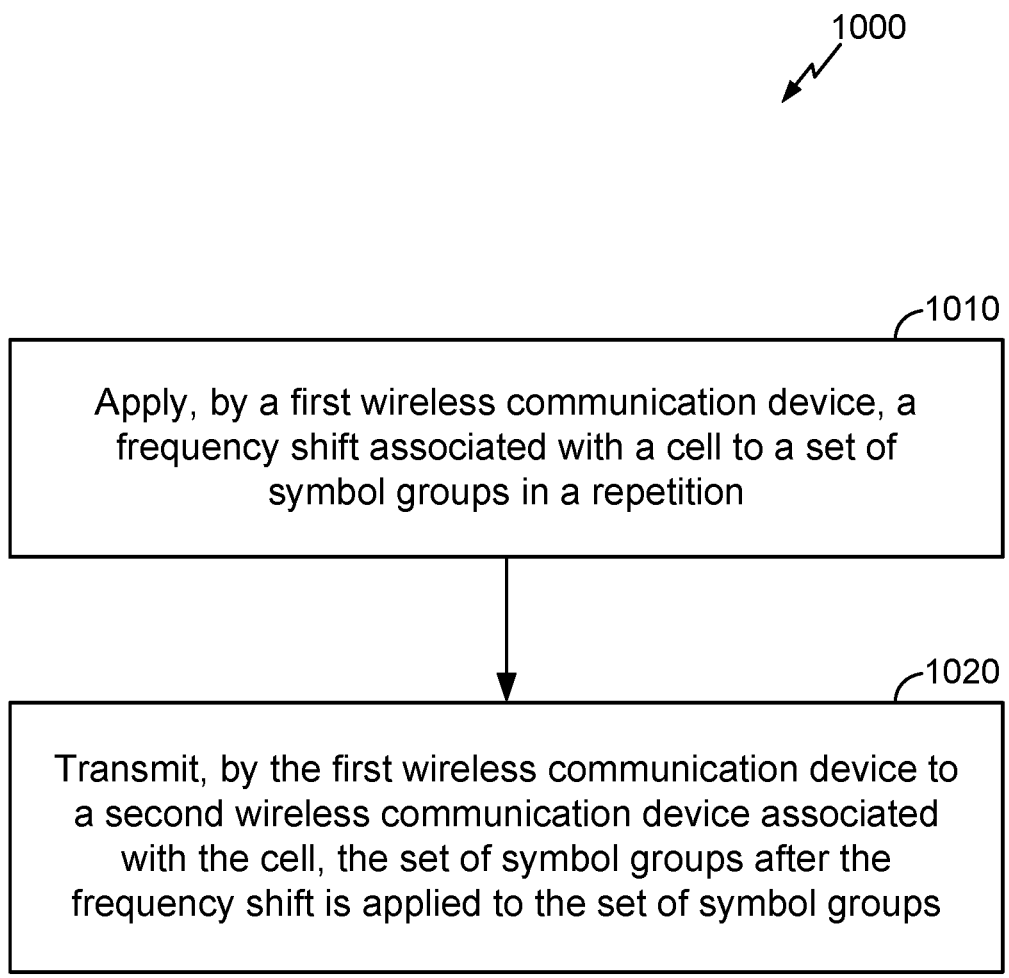
FIG. 10 is a flow diagram of a method of modifying a signal by applying one or more frequency shifts to a set of symbol groups according to embodiments of the present disclosure.

FIG. 10 is a flow diagram of a method 1000 of modifying a signal by applying one or more frequency shifts to a set of symbol groups according to embodiments of the present disclosure. Steps of the method 1000 can be executed by a computing device (e.g., a processor, processing circuit, and/or other suitable component) of a wireless communication device, such as the UEs 102, 300, and/or 500. The method 1000 may employ similar mechanisms as described with respect to the network 100. The method 1000 can be better understood with reference to FIG. 2. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes applying, by a first wireless communication device, a frequency shift associated with a cell to a set of symbol groups in a repetition. At step 1020, the method 1000 includes transmitting, by the first wireless communication device to a second wireless communication device associated with the cell, the set of symbol groups after the frequency shift is applied to the set of symbol groups.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
applying, by a first wireless communication device, a scrambling sequence to a set of symbol groups in a first repetition of a random access channel (RACH) signal, the RACH signal including the first repetition and a second repetition, the applying the scrambling sequence excluding the second repetition of the RACH signal, and the scrambling sequence being associated with a cell; and
transmitting, by the first wireless communication device to a second wireless communication device associated with the cell, the set of symbol groups in accordance with the applied scrambling sequence.

2. The method of claim 1, wherein the scrambling sequence is cell dependent.

3. The method of claim 2, wherein different repetitions in the cell have a same predefined scrambling sequence or have different predefined scrambling sequences.

4. The method of claim 1, wherein the scrambling sequence includes entries of a constant absolute value.

5. The method of claim 1, wherein the applying the scrambling sequence results in a magnitude of the set of symbol groups remaining the same.

6. The method of claim 1, wherein the applying the scrambling sequence includes applying a phase shift to one or more symbol groups of the set of symbol groups.

7. The method of claim 1, further comprising:
receiving, by the first wireless communication device, a cell ID of the cell; and
determining, by the first wireless communication device, the scrambling sequence based on the cell ID.

8. The method of claim 1, wherein the scrambling sequence defines a set of values, wherein the applying the scrambling sequence includes rotating a first symbol group of the set of symbol groups by a first value listed in the set of values and rotating a second symbol group of the set of symbol groups by a second value listed in the set of values.

9. The method of claim 1, comprising:
applying, by the first wireless communication device, a frequency shift to the set of symbol groups in the first repetition, the frequency shift being associated with the cell, and wherein the transmitting includes transmitting the set of symbol groups in accordance with the applied frequency shift.

10. The method of claim 1, wherein each symbol group includes a group of symbols, each symbol being a single tone transmission.

11. The method of claim 1, comprising:
applying, by the first wireless communication device, a second scrambling sequence to a second set of symbol groups in the second repetition of the RACH signal, the second scrambling sequence being associated with the cell; and
transmitting, by the first wireless communication device to the second wireless communication device associated with the cell, the second set of symbol groups in accordance with the applied second scrambling sequence.

12. The method of claim 1, comprising:
applying, by the first wireless communication device, a second scrambling sequence to a third set of symbol groups in the first repetition of the RACH signal; and
transmitting, by the first wireless communication device to the second wireless communication device associated with the cell, the third set of symbol groups in accordance with the applied second scrambling sequence.

13. A system for wireless communication, comprising:
a scrambler that applies a scrambling sequence to a set of symbol groups in a first repetition of a random access channel (RACH) signal, wherein the RACH signal includes the first repetition and a second repetition, wherein the scrambler excludes the scrambling sequence from being applied to the second repetition, and wherein the scrambling sequence is associated with a cell; and
a transceiver that transmits to a first wireless communication device associated with the cell, the set of symbol groups in accordance with the applied scrambling sequence.

14. The system of claim 13, further comprising:
a second wireless communication device that includes the scrambler and the transceiver.

15. The system of claim 13, wherein the scrambler applies a second scrambling sequence to the second repetition of the RACH signal, and the scrambling sequence applied to the set of symbol groups in the first repetition is different from the second scrambling sequence.

16. The system of claim 13, wherein the scrambler applies different scrambling sequences at symbol group levels in the first repetition of the RACH signal.

17. An apparatus for wireless communication, comprising:
means for applying a scrambling sequence to a set of symbol groups in a first repetition of a random access channel (RACH) signal, the RACH signal including the first repetition and a second repetition, the means for applying the scrambling sequence excluding the second repetition, and the scrambling sequence being associated with a cell; and
means for transmitting the set of symbol groups in accordance with the applied scrambling sequence.

18. A non-transitory computer-readable medium having program code recorded thereon, the program code comprising:
code for causing a first wireless communication device to apply a scrambling sequence to a set of symbol groups in a first repetition of a random access channel (RACH) signal, the RACH signal including the first repetition and a second repetition, the code for causing the first wireless communication device to apply the scrambling sequence excluding the second repetition, and the scrambling sequence being associated with a cell; and
code for causing the first wireless communication device to transmit to a second wireless communication device associated with the cell, the set of symbol groups in accordance with the applied scrambling sequence.

19. The non-transitory computer-readable medium of claim 18, the program code comprising:
code for causing the first wireless communication device to receive a cell ID of the cell; and
code for causing the first wireless communication device to determine the scrambling sequence based on the cell ID.

20. The non-transitory computer-readable medium of claim 18, wherein different cells use different scrambling sequences.

\* \* \* \* \*